US012681720B2

(12) United States Patent
Ren et al.

(10) Patent No.: US 12,681,720 B2
(45) Date of Patent: Jul. 14, 2026

(54) PATCH RELEASE METHOD, SERVER, AND TERMINAL DEVICE

(71) Applicant: Huawei Technologies Co., Ltd., Shenzhen (CN)

(72) Inventors: Wenjie Ren, Beijing (CN); Qiaosheng Han, Wuhan (CN); Yonghong Yin, Beijing (CN); Yingwei Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 84 days.

(21) Appl. No.: 17/635,300

(22) PCT Filed: Aug. 4, 2020

(86) PCT No.: PCT/CN2020/106694
§ 371 (c)(1),
(2) Date: Feb. 14, 2022

(87) PCT Pub. No.: WO2021/027613
PCT Pub. Date: Feb. 18, 2021

(65) Prior Publication Data
US 2022/0291918 A1 Sep. 15, 2022

(30) Foreign Application Priority Data

Aug. 14, 2019 (CN) .......................... 201910750608.9

(51) Int. Cl.
*G06F 8/658* (2018.01)
(52) U.S. Cl.
CPC ................................... *G06F 8/658* (2018.02)

(58) Field of Classification Search
CPC ............................. G06F 8/60–66; G06F 3/123
See application file for complete search history.

(56) References Cited

U.S. PATENT DOCUMENTS

| | | | | |
|---|---|---|---|---|
| 6,466,999 B1 * | 10/2002 | Sliger | ..................... | H03M 7/30 |
| | | | | 710/33 |
| 7,031,972 B2 * | 4/2006 | Ren | .......................... | G06F 8/658 |
| | | | | 707/827 |
| 8,479,189 B2 * | 7/2013 | Chen | ....................... | G06F 8/658 |
| | | | | 717/173 |
| 9,886,265 B2 * | 2/2018 | Coffing | ................. | G06F 3/0673 |
| 10,735,260 B2 * | 8/2020 | Maeda | .............. | H04L 12/40013 |

(Continued)

FOREIGN PATENT DOCUMENTS

| | | |
|---|---|---|
| CN | 104731915 A | 6/2015 |
| CN | 106095619 A | 11/2016 |

(Continued)

*Primary Examiner* — Todd Aguilera
(74) *Attorney, Agent, or Firm* — Leydig, Voit & Mayer, Ltd.

(57) ABSTRACT

When a repair problem exists in a case of a fully loaded partition, or when a feature of a terminal device needs to be expanded but there is no remaining space in a related partition, the terminal device may search for and download a patch file from a server, and a compressed empty device (loop) is used to expand the feature. In some conditions, the empty loop device and the fully loaded partition may be combined to form a new device. In some other conditions, based on a packaging technology in a disk block dimension, a changed file is repackaged in the disk block dimension.

19 Claims, 7 Drawing Sheets

(56)                   References Cited

U.S. PATENT DOCUMENTS

| | | | | |
|---|---|---|---|---|
| 10,834,207 | B2 * | 11/2020 | Acharya | H04L 12/40 |
| 2004/0068721 | A1 * | 4/2004 | O'Neill | G06F 8/65 |
| | | | | 709/202 |
| 2005/0021572 | A1 * | 1/2005 | Ren | G06F 8/658 |
| | | | | 707/999.203 |
| 2007/0028226 | A1 * | 2/2007 | Chen | G06F 8/658 |
| | | | | 717/136 |
| 2008/0117991 | A1 * | 5/2008 | Peddireddy | G06F 9/44557 |
| | | | | 375/241 |
| 2015/0301823 | A1 | 10/2015 | Hatakeyama | |
| 2017/0269928 | A1 * | 9/2017 | Coffing | G06F 3/0619 |
| 2018/0152341 | A1 * | 5/2018 | Maeda | H04L 41/082 |
| 2018/0165301 | A1 | 6/2018 | Luo et al. | |
| 2018/0307479 | A1 | 10/2018 | Subramanian et al. | |
| 2018/0349129 | A1 * | 12/2018 | Ju | G06F 8/654 |
| 2019/0056890 | A1 | 2/2019 | Wookey et al. | |
| 2019/0155598 | A1 | 5/2019 | Bainville et al. | |
| 2019/0265965 | A1 * | 8/2019 | Acharya | H04L 9/3263 |

FOREIGN PATENT DOCUMENTS

| | | | |
|---|---|---|---|
| CN | 107346252 | A | 11/2017 |
| CN | 108038112 | A | 5/2018 |
| CN | 109582323 | A | 4/2019 |
| CN | 109697071 | A | 4/2019 |
| CN | 109766114 | A | 5/2019 |
| CN | 110045980 | A | 7/2019 |
| CN | 110109695 | A | 8/2019 |
| JP | 2002175157 | A | 6/2002 |
| JP | 5692829 | B1 | 4/2015 |

* cited by examiner

100

300

Server 10

Original patch file a: Divide the original patch file into a plurality of patch blocks

| 11 | 12 | 13 | 14 | 15 | 16 | 17 | b: Divide the latest patch file into a plurality of patch blocks c: Compare the patch blocks, and determine a target patch block

| 1 | 2 | 3 | 4 | 5 | 6 | 7 |

Latest patch file d: An original patch block is in an original image file 000 000 e: The target patch block is in a newly added disk partition

00100101010100 f: Generate a new binary file through packaging, where the new image file carries repair code

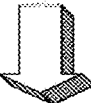

400: The server determines a new image file (system_new)

FIG. 4

Server 10

Network 30

Patch file 40

To-be-repaired terminal device 20

To-be-repaired
fully loaded partition

Patch partition

Generate a new partition
by using a block (block)
differential file

PATCH RELEASE METHOD, SERVER, AND TERMINAL DEVICE

CROSS-REFERENCE TO RELATED APPLICATIONS

This application is a National Stage of International Application No. PCT/CN2020/106694 filed on Aug. 4, 2020, which claims priority to Chinese Patent Application No. 201910750608.9, filed on Aug. 14, 2019, both of which are hereby incorporated by reference in their entireties.

TECHNICAL FIELD

This application relates to the field of electronic technologies, and in particular, to a patch release method, a server, and a terminal device.

BACKGROUND

When a terminal device updates or upgrades a system, the terminal device first obtains a latest file from a server, installs the latest file, and overwrites an original system installation package. Alternatively, in a process in which a user uses an application (App) by using a terminal device, when a bug occurs in the application and urgent repair needs to be performed, an application side usually repackages the app, does a test, performs package replacement for each application market and channel, and prompts the user to perform upgrading. The user downloads, by using the terminal device, a patch package from a server corresponding to the application, installs the patch package, and overwrites an original application installation package.

For example, the terminal device requests the server to perform patch-based repair. In a patch release process, package replacement needs to be performed and other release needs to be made at high costs only to modify a line of code. In addition, during file system-based repair, a file on the terminal device side needs to be fully replaced, and there is a large amount of redundant information in the terminal device due to repair of a plurality of files. In addition, in a scenario in which a partition of the terminal device is tight, fast repair cannot be implemented.

SUMMARY

This application provides a patch release method, a server, and a terminal device. In the method, a file whose content is changed or newly added may be repackaged based on a disk block, to ensure that the file can still be written into an added disk block in a case of a fully loaded partition, and improve patch release efficiency.

According to a first aspect, a patch release method is provided. The method includes: A server obtains a patch file; divides the patch file into a plurality of patch blocks; the server determines a target patch block from the plurality of patch blocks, where the target patch block includes content that is in the patch file and that is added or changed relative to an original file in a terminal device; and the server sends an update file to the terminal device, where the update file includes the target patch block.

With reference to the first aspect, in some embodiments of the first aspect, the update file further includes information about a location of each target patch block in the patch file.

With reference to the first aspect and the foregoing embodiment, in some embodiments of the first aspect, the location of each target patch block in the patch file corresponds to a location in the patch file.

It should be understood that a size of the patch file is usually limited. If the patch file is too large, the patch file cannot be accurately sent to the terminal device. According to the foregoing technical solution, based on a packaging technology in a disk block dimension, a changed file is repackaged in the disk block dimension, to ensure that the file can still be written into an added disk block in a case of a fully loaded partition, so that an offset between a disk block of a previous patch file and a disk block of a current patch file is small. After differential processing is performed, a determined latest patch file is small, so that a very small space can be used for repair. In addition, the changed patch file is packaged in the disk block dimension, so that only a disk block of the patch file changes, and a disk block of another file is not affected, to improve patch release efficiency.

According to a second aspect, a patch release method is provided. The method further includes: A server obtains a patch file; the server divides the patch file into at least two subfiles based on a first storage space, where the first storage space is a storage space used by a terminal device to store an original file corresponding to the patch file, and a size of a storage space occupied by a first subfile in the at least two subfiles is less than or equal to a size of the first storage space; and the server sends the at least two subfiles and first information to the terminal device, where the first information is used to indicate to combine the at least two subfiles to form a virtual machine device for use.

With reference to the second aspect, in some embodiments of the second aspect, the method further includes: The server receives second information sent by the terminal device, where the second information is used to indicate that a difference between the size of the first storage space and a size of the storage space occupied by the original file is less than or equal to a preset threshold.

With reference to the second aspect and the foregoing embodiment, in some embodiments of the second aspect, the method further includes: The server receives third information sent by the terminal device, where the second information is used to indicate the size of the first storage space.

In the foregoing technical solution, a process of generating a new patch file (a latest patch file) on the server side is described. When a repair problem exists in a case of a fully loaded partition, or when a feature of the terminal device needs to be expanded but there is no remaining space in a related partition, a compressed empty device (loop) may be used to expand the feature. Specifically, the empty loop device and the fully loaded partition may be combined to form a new device, so that a very small space can be used for configuration and expansion to obtain a large space, to improve patch release efficiency.

According to a third aspect, a patch release method is provided. The method includes: A terminal device receives an update file sent by a server, where the update file includes a target patch block, the target patch block includes content that is in a patch file and that is added or changed relative to an original file in the terminal device, the patch file is divided into a plurality of patch blocks, and the target patch block is determined from the plurality of patch blocks; the terminal device determines the patch file based on the update file and the original file; and the terminal device performs updating based on the patch file.

With reference to the third aspect, in some embodiments of the third aspect, the update file further includes information about a location of each target patch block in the patch file.

With reference to the third aspect and the foregoing embodiment, in some embodiments of the third aspect, the location of each target patch block in the patch file corresponds to a location in the patch file.

According to a fourth aspect, a patch release method is provided. The method includes: A terminal device receives at least two subfiles and first information that are sent by a server, where the at least two subfiles are obtained by dividing a patch file, a size of a storage space occupied by a first subfile in the at least two subfiles is less than or equal to a size of a first storage space, and the first storage space is a storage space used by the terminal device to store an original file corresponding to the patch file; the terminal device stores the first subfile in the first storage space, and stores, in at least one second storage space, a file other than the first subfile in the at least two subfiles; and when running a program corresponding to the patch file, the terminal device combines the at least two subfiles to form a virtual machine device.

With reference to the fourth aspect, in some embodiments of the fourth aspect, the method further includes: The terminal device sends second information to the server, where the second information is used to indicate that a difference between the size of the first storage space and a size of the storage space occupied by the original file is less than or equal to a preset threshold.

With reference to the fourth aspect and the foregoing embodiment, in some embodiments of the fourth aspect, the method further includes: The terminal device sends third information to the server, where the second information is used to indicate the size of the first storage space.

According to a fifth aspect, a patch release apparatus is provided. The apparatus includes: an obtaining unit, configured to obtain a patch file; a processing unit, configured to divide the patch file into a plurality of patch blocks, where the processing unit is further configured to determine a target patch block from the plurality of patch blocks, where the target patch block includes content that is in the patch file and that is added or changed relative to an original file in a terminal device; and a sending unit, configured to send an update file to the terminal device, where the update file includes the target patch block.

With reference to the fifth aspect, in some embodiments of the fifth aspect, the update file further includes information about a location of each target patch block in the patch file.

With reference to the fifth aspect and the foregoing embodiment, in some embodiments of the fifth aspect, the location of each target patch block in the patch file corresponds to a location in the patch file.

According to a sixth aspect, a patch release apparatus is provided. The apparatus includes: a processing unit, configured to divide a patch file into at least two subfiles based on a first storage space, where the first storage space is a storage space used by a terminal device to store an original file corresponding to the patch file, and a size of a storage space occupied by a first subfile in the at least two subfiles is less than or equal to a size of the first storage space; and a sending unit, configured to send the at least two subfiles and first information, where the first information is used to indicate to combine the at least two subfiles to form a virtual machine device for use.

With reference to the sixth aspect, in some embodiments of the sixth aspect, the apparatus further includes: an obtaining unit, configured to receive second information sent by the terminal device, where the second information is used to indicate that a difference between the size of the first storage space and a size of the storage space occupied by the original file is less than or equal to a preset threshold.

With reference to the sixth aspect and the foregoing embodiment, in some embodiments of the sixth aspect, the obtaining unit is further configured to receive third information sent by the terminal device, where the second information is used to indicate the size of the first storage space.

According to a seventh aspect, a patch release apparatus is provided. The apparatus includes: an obtaining unit, configured to receive an update file sent by a server, where the update file includes a target patch block, the target patch block includes content that is in a patch file and that is added or changed relative to an original file in a terminal device, the patch file is divided into a plurality of patch blocks, and the target patch block is determined from the plurality of patch blocks; and a processing unit, configured to determine the patch file based on the update file and the original file, where the processing unit is further configured to perform updating based on the patch file.

With reference to the seventh aspect, in some embodiments of the seventh aspect, the update file further includes information about a location of each target patch block in the patch file.

With reference to the seventh aspect and the foregoing embodiment, in some embodiments of the seventh aspect, the location of each target patch block in the patch file corresponds to a location in the patch file.

According to an eighth aspect, a patch release apparatus is provided. The apparatus includes: an obtaining unit, configured to receive at least two subfiles and first information that are sent by a server, where the at least two subfiles are obtained by dividing a patch file, a size of a storage space occupied by a first subfile in the at least two subfiles is less than or equal to a size of a first storage space, and the first storage space is a storage space used by a terminal device to store an original file corresponding to the patch file; and a processing unit, configured to: store the first subfile in the first storage space, and store, in at least one second storage space, a file other than the first subfile in the at least two subfiles; and when running a program corresponding to the patch file, combine the at least two subfiles to form a virtual machine device for use.

With reference to the eighth aspect, in some embodiments of the eighth aspect, the sending unit is further configured to send second information to the server, where the second information is used to indicate that a difference between the size of the first storage space and a size of the storage space occupied by the original file is less than or equal to a preset threshold.

With reference to the eighth aspect and the foregoing embodiment, in some embodiments of the eighth aspect, the sending unit is further configured to send third information to the server, where the second information is used to indicate the size of the first storage space.

According to a ninth aspect, this application provides an apparatus. The apparatus is included in an electronic apparatus, and the apparatus has a function of implementing behavior of the electronic apparatus in the foregoing aspects and the possible embodiments of the foregoing aspects. The function may be implemented by hardware, or may be implemented by corresponding software executed by hardware. The hardware or the software includes one or more modules or units corresponding to the foregoing function, for example, a display module or unit, a detection module or unit, or a processing module or unit.

According to a tenth aspect, this application provides a terminal apparatus, including a touch display, where the touch display includes a touch-sensitive surface and a display; a camera; one or more processors; a memory; a plurality of applications; and one or more computer programs. The one or more computer programs are stored in the memory, and the one or more computer programs include instructions. When the instructions are executed by the terminal apparatus, the terminal apparatus is enabled to perform the patch release method in any possible embodiment of any one of the foregoing aspects.

According to an eleventh aspect, this application provides an apparatus, including one or more processors and one or more memories. The one or more memories are coupled to the one or more processors, the one or more memories are configured to store computer program code, the computer program code includes computer instructions, and when the one or more processors execute the computer instructions, the apparatus is enabled to perform the patch release method in any possible embodiment of any one of the foregoing aspects.

According to a twelfth aspect, this application provides a computer storage medium, including computer instructions. When the computer instructions run on an electronic apparatus, the electronic apparatus is enabled to perform the patch release method in any possible embodiment of any one of the foregoing aspects.

According to a thirteenth aspect, this application provides a computer program product. When the computer program product runs on an electronic apparatus, the electronic apparatus is enabled to perform the patch release method in any possible embodiment of any one of the foregoing aspects.

According to a fourteenth aspect, a chip system is provided. The chip system includes: a memory, configured to store instruction; and a processor, configured to invoke and run the instructions from the memory, so that a device on which the chip system is installed performs the patch release method in any possible embodiment of any one of the foregoing aspects.

BRIEF DESCRIPTION OF DRAWINGS

FIG. 4 is a schematic diagram of a process in which a server generates a patch file according to an embodiment of this application;

DESCRIPTION OF EMBODIMENTS

The following describes technical solutions in the embodiments of this application with reference to accompanying drawings in the embodiments of this application.

In the descriptions of the embodiments of this application, the terms "first" and "second" are merely intended for description, and shall not be understood as an indication or implication of relative importance or implicit indication of a quantity of indicated technical features. Therefore, a feature limited by "first" or "second" may explicitly or implicitly include one or more features, for example, a "latest patch file" and a "new image file" in this application.

A patch release method provided in this application may be used to update a system of a terminal device, or update or repair an application on the terminal device. In the descriptions of the embodiments, a patch-based repair is used as an example for description. This is not limited in this application.

Figure 1:
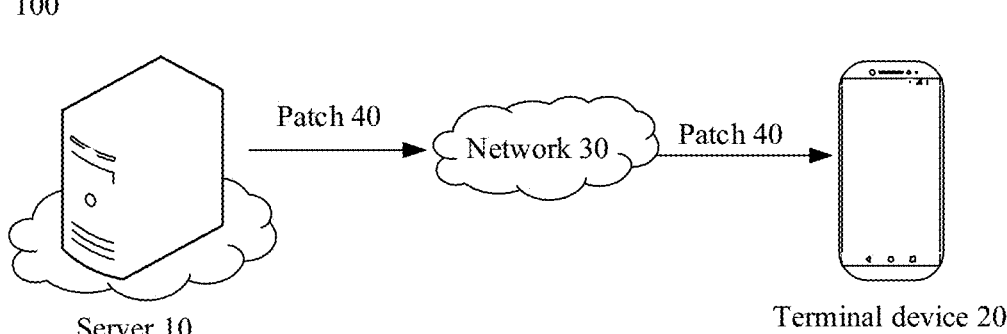
FIG. 1 is a schematic diagram of a patch release process according to this application.

FIG. 1 is a schematic diagram of a patch release process according to this application. A process in which a user uses an application (App) by using a terminal device is used as an example. After an application is released, when the user uses the application by using the terminal device, if a bug occurs and urgent repair needs to be performed, an application side usually repackages the app, does a test, performs package replacement for each application market and channel, and prompts the user to perform upgrading. The user downloads, by using the terminal device, a patch package from a server corresponding to the application, installs the patch package, and overwrites an original application installation package. In the patch release process, package replacement needs to be performed and other release needs to be made at high costs only to modify a line of code. As shown in FIG. 1, a patch release system 100 may include a server 10 and a terminal device 20. The terminal device 20 communicates with the server 10 through a network 30.

The server 10 may also be referred to as the cloud, a cloud side, or the like, and the terminal device 20 may be referred to as a terminal side. The terminal device 20 may be an electronic device such as a mobile phone, a tablet computer, a wearable electronic device (for example, a smartwatch) having a wireless communication function, a vehicle-mounted device, an augmented reality (AR) device/a virtual reality (VR) device, a notebook computer, an ultra-mobile personal computer (UMPC), a netbook, or a personal digital assistant (PDA). Optionally, the terminal device 20 may include but not limited to a portable electronic device using iOS®, Android®, Microsoft®, or another operating system. In some embodiments, the electronic device may be a smart appliance, for example, a smart speaker or a smart home device. Specific types of the terminal device 20 and the server 10 are not limited in this embodiment of this application.

As shown in FIG. 1, when an application running on the terminal device 20 needs to be repaired, the terminal device 20 requests a new patch 40 from the server 10 corresponding to the application. After obtaining the patch 40, the server 10 may deliver the patch 40 to the terminal device 20 through the network. The terminal device 20 may verify the patch and perform upgrading, and further replace or overwrite an original installation package of the application to install the patch, so as to complete a repair process of the application.

Figure 2:
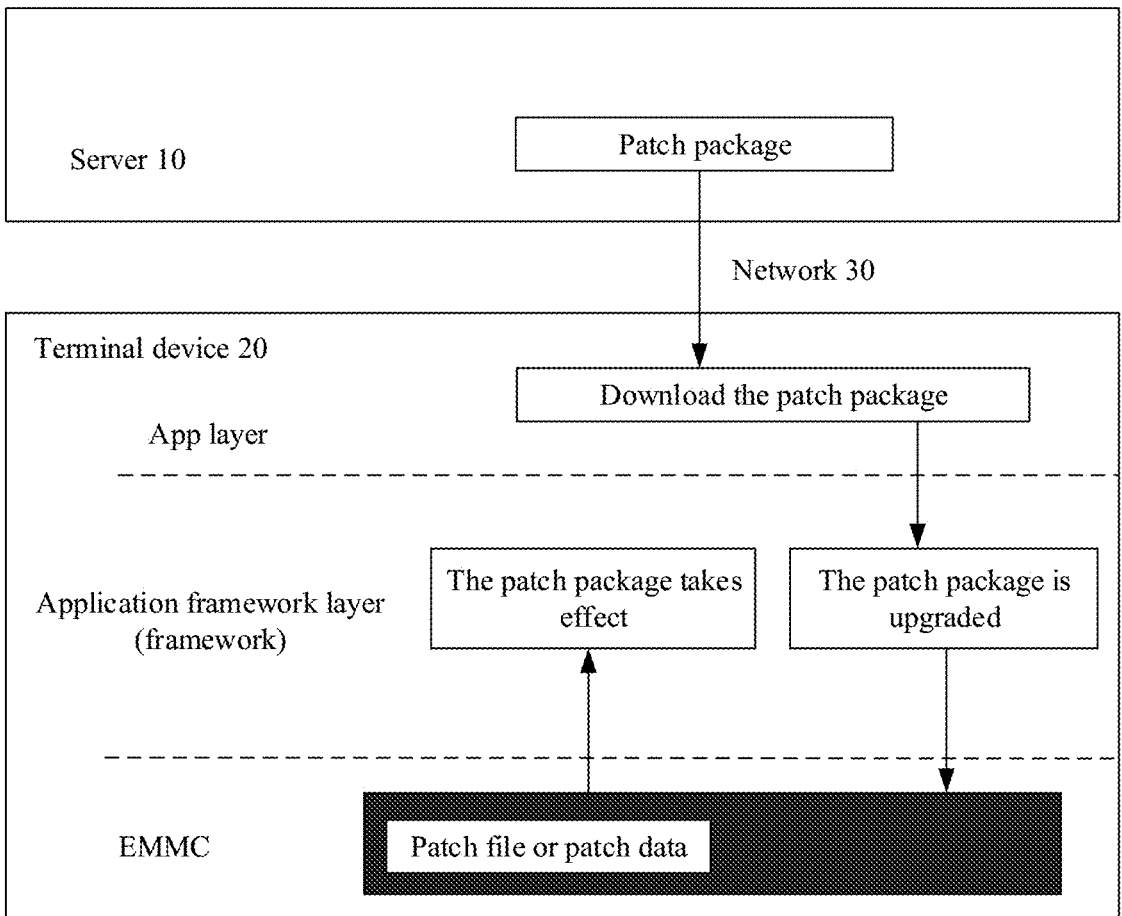
FIG. 2 is a schematic diagram of another patch release process according to this application.

FIG. 2 is a schematic diagram of another patch release process according to this application. In FIG. 2, a terminal device 20 using an Android system (Android) is used as an example. The Android system provides a running environment and various services for various applications of the terminal device, for example, a screen lock service, a file encryption service, and running of a third-party application (APP). With reference to the patch release process described in this application, a system architecture of the terminal device 20 may be divided into four layers that are respectively an application (APP) layer, an application framework layer (framework), and a system storage area from top to bottom.

The application layer may include a series of application packages, for example, Camera, Gallery, Calendar, Phone, Map, Navigation, WLAN, BLUETOOTH, Music, and Messages. The application framework layer provides an application programming interface (API) and a programming framework for an application at the application layer, the application framework layer may include some predefined functions, and may include an initialization (init) process, a user space daemon obtained by performing a fork operation on the initialization process, a HAL layer, a boot animation, and the like. An embedded multimedia card (EMMC) shown in FIG. 2 may be a type of system storage, and is not described in detail herein.

For example, with reference to FIG. 1 and FIG. 2, in the patch release processes, on a side of the server 10, a patch compression package is first generated, and an operation such as encryption is performed on the patch compression package to generate a patch package file to be finally released to the server 10.

On a side of the terminal device 20, when an app running on the terminal device 20 needs to be repaired, the terminal device 20 requests a patch package file of the application from the server 10, searches for a package by using an app layer, downloads the patch package file from the server 10, verifies the patch package file, upgrades and updates a patch package, and stores an obtained image file (a new patch file) in a patch partition of the EMMC. Then the terminal device 20 initializes (init) the patch data, loads a patch, and then replaces or overwrites an original installation package of the application to install the patch, to complete a repair process of the application.

The foregoing described entire patch-based repair process may be understood as a file system-based patch release technology. A to-be-repaired file may be fully replaced. A differential technology is not used. A complete file obtained after a differential combination cannot be stored. In addition, more partition spaces are required in the patch release process. Consequently, a repair problem in a case of an associated file cannot be resolved. In addition, an overlay patch release technology can only be used to repair file access after a file is started. Before a file system is started, in a case of a kernel access file, the file cannot be repaired. For example, a plurality of patch files at a plurality of layers may be used for one time of repair. If a plurality of files are repaired, a repaired redundant package is delivered to the terminal device. Consequently, a large amount of redundant information is delivered.

In another embodiment, in a system image, a super file system (extendable read-only file system, EROFS) is used for packaging. During packaging performed by using the EROFS file system, a format of a disk block for packaging can be customized. However, the overlay patch release technology is based on full replacement of a file. Therefore, this method cannot be combined with the overlay patch release technology to optimize a patch package. In addition, when a partition is fully loaded with data, patch-based repair cannot be performed by adding a new file.

This application provides a patch release method, so that when a terminal device has an urgent repair problem that needs to be resolved, or when a partition is fully loaded with data, a current repair problem can be resolved. With reference to FIG. 3 to FIG. 7, the following describes in detail the patch release method provided in this application.

Figure 3:
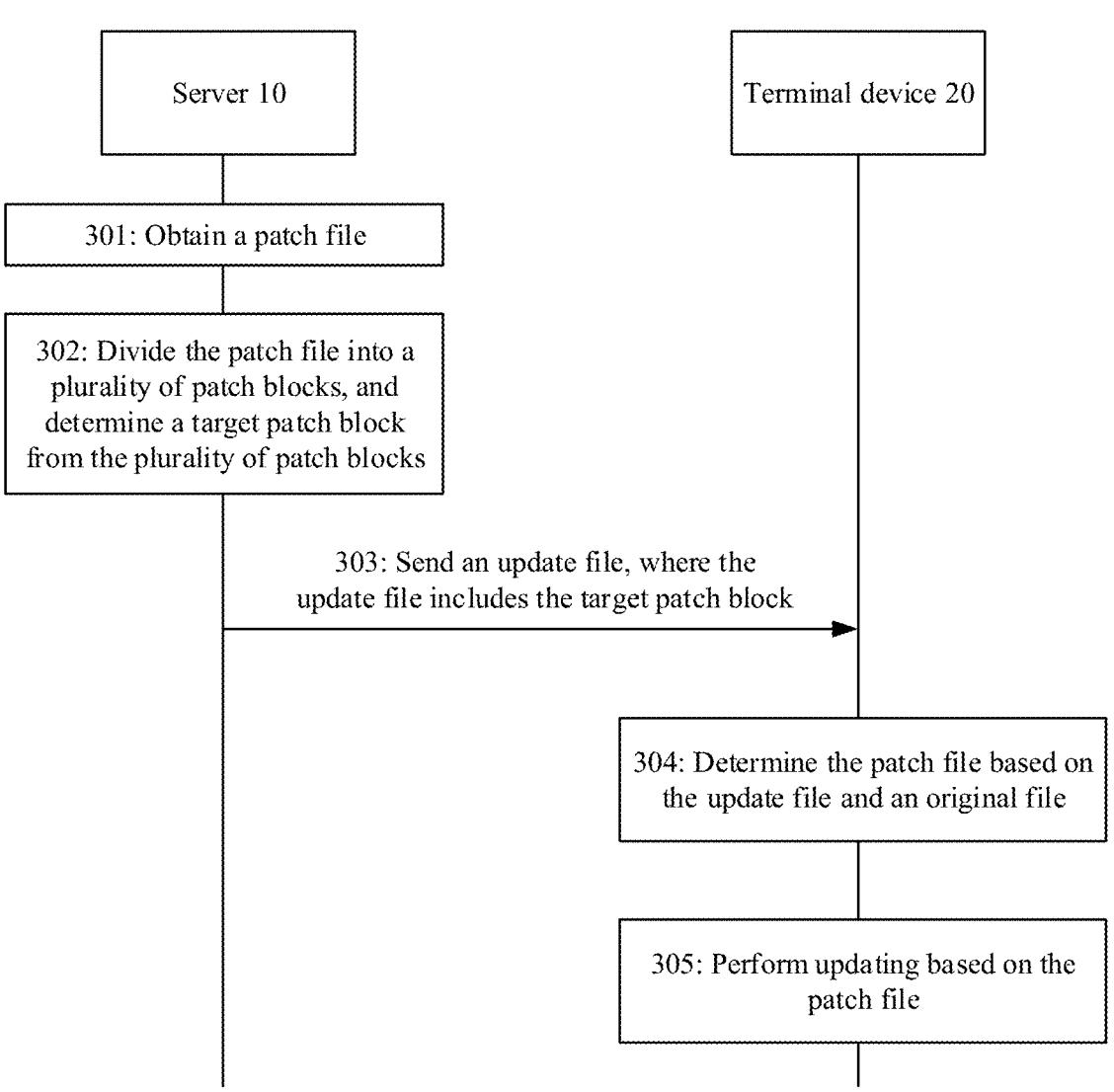
FIG. 3 is a schematic flowchart of a patch release method according to an embodiment of this application.

FIG. 3 is a schematic flowchart of a patch release method according to an embodiment of this application. As shown in FIG. 3, the method may include the following content.

301: A server 10 obtains a patch file.

302: The server 10 divides the patch file into a plurality of patch blocks, and determines a target patch block from the plurality of patch blocks, where the target patch block includes content that is in the patch file and that is added or changed relative to an original file in a terminal device 20.

303: The server 10 sends an update file to the terminal device 20, and the terminal device accordingly receives the update file sent by the server, where the update file includes the target patch block.

304: The terminal device 20 determines the patch file based on the update file and the original file.

305: The terminal device 20 performs updating based on the patch file.

In a repair process of the terminal device 20 in this application, a previous patch file obtained from the server 10 and a current patch file obtained from the server 10 are respectively referred to as an "original patch file" and a "latest patch file". The original patch file is the previous patch file obtained by the terminal device 20 from the server 10. The latest patch file is the following current patch file obtained by the terminal device 20 from the server 10.

It should be understood that before the server 10 obtains the patch file, the terminal device 20 sends a patch update request to the server 10. The patch update request may include information about the original file currently stored in the terminal device 20. The server 10 may learn of the original file currently stored in the terminal device.

FIG. 4 is a schematic diagram of a process in which a server generates a patch file according to an embodiment of this application. As shown in FIG. 4, a process 400 in which the server 10 generates a patch file may include step a to step f.

a: The server 10 divides an original patch file into a plurality of patch blocks.

b: The server 10 divides a latest patch file into a plurality of patch blocks.

It should be understood that the latest patch file herein is a patch file whose content is changed or updated relative to the previous original patch file.

For example, the patch file may be divided in a disk block dimension. For example, the disk block dimension may be referred to as a "block". Optionally, each block may be 4 KB. This is not limited in this application. In step a and step b, a smaller offset between a disk block of a previous patch file and a disk block of a current patch file leads to a smaller latest patch file determined after differential processing is performed. Therefore, a very small space can be used for repair.

For example, it is assumed that the previous patch file (the original patch file) is used as a file entirety, and includes blocks 1, 2, 3, 4, 5, 6, and 7. When the block 1 of the latest patch file is changed, after differential processing is performed on the previous patch file (the original patch file) and the latest patch file, all the blocks 1, 2, 3, 4, 5, 6, and 7 of the formed latest patch file are changed relative to the previous patch file (the original patch file) due to the change of the block 1. Therefore, all the blocks 1, 2, 3, 4, 5, 6, and 7 are used as content of the new patch file and are delivered to the terminal device. In other words, a differential offset is large, and consequently, the patch file is too large. However, a size of the patch file is usually limited, for example, limited to 32 MB.

In a possible embodiment, for files whose same content is changed, any one of the following methods may be used to rearrange the new patch file, and ensure that the offset between the disk blocks is small. Specific methods are as follows:

(1) A same timestamp is used for previous and current packaging.

For example, when a differential offset between the two patch files is affected by the timestamp, the previous patch file and the current patch file may be packaged by using a same timestamp. For example, a timestamp used to package the previous original patch file is used to package the current new patch file, so that the two patch files can be aligned in terms of the timestamp, and a differential offset between the previous and current packaging processes is reduced.

(2) A same salt is used to obfuscate previous and current packaging.

For example, security, for example, a decompilation capability, of the patch file needs to be improved in a process of generating the patch file. Optionally, the server may obfuscate the patch file by using a random value in a process of packaging the patch file.

For example, a same random value (salt) is used to obfuscate the previous original patch file and the current new patch file. In other words, two times of packaging have a same obfuscation effect, so that a differential offset between the two times of packaging can be reduced, and security of the patch file is improved.

(3) Map of previous compilation and current compilation is used to rearrange results, to minimize the offset between the disk blocks.

When a generated patch file exists in a form of source code rather than in a form of a file system, the source code may include a plurality of different classes such as a class 1 and a class 2. In a compilation process, for the original patch file, the class 1 may be compiled before the class 2; and for the new patch file, the class 2 may be compiled before the class 1. In this case, in processes of two times of differential processing, a differential offset between the previous compilation and the current compilation is very large. Consequently, the new patch file is also very large.

To reduce the differential offset between the previous compilation and the current compilation, map of the previous compilation and the current compilation may be used to rearrange the results, so that the offset between the disk blocks of the previous patch file and the current patch file is small.

It should be understood that a size of the patch file is usually limited. If the patch file is too large, the patch file cannot be accurately sent to the terminal device. According to different disk block arrangement methods provided in the foregoing technical solution, the offset between the disk blocks of the previous patch file and the current patch file can be small, and a small latest patch file is determined after differential processing is performed, so that a very small space can be used for repair.

c: Compare the plurality of patch blocks included in the original patch file and the plurality of patch blocks included in the latest patch file, and determine the target patch block.

d: Some original patch blocks are in an original image file.

e: The target patch block is in a tail disk block.

It should be understood that the target patch block includes content that is in the patch file and that is added or changed relative to the original file in the terminal device. For example, as shown in FIG. 4, the original patch file includes a plurality of patch blocks, namely, blocks 11, 12, 13, 14, 15, 16, and 17, and the latest patch file includes a plurality of patch blocks, namely, blocks 1, 2, 3, 4, 5, 6, and 7. The server 10 determines, by comparing each patch block, the target patch block that is added or changed. It is assumed that the blocks 1, 2, 3, and 4 in the patch blocks of the latest patch file are not changed, and the blocks 5, 6, and 7 are newly added patch blocks. The blocks 1, 2, 3, and 4 are referred to as original patch blocks, and are stored in the original image file. The blocks 5, 6, and 7 whose content is updated or changed are used as target patch blocks and placed in a newly added disk partition.

Optionally, the server 10 may further obtain basic information of the new patch file to obtain directory entry (dentry) information. When dividing, into blocks, content occupied by a file, the server 10 may obtain dentry information and block information in the patch file. The server 10 may accurately learn of a specific block whose content is changed or updated.

f: Generate a new binary file through packaging, in other words, generate a new image file (system_new), where the new image file carries repair code.

In step a to step f, a process in which the server 10 determines the new image file (system_new) is described. In this case, the server 10 may generate the new image file (system_new).

In a possible case, if a disk is fully loaded when the blocks 1, 2, 3, and 4 are occupied in the original image of the original patch file, disk blocks of the blocks 5, 6, and 7 of the new patch file fall beyond a size of the original image. A newly added empty partition 000000 is used to form a new image file, and the disk blocks of the blocks 5, 6, and 7 of the new patch file are further placed in the empty partition 000000, to expand the disk partition, in other words, configure a larger space.

Figure 5:
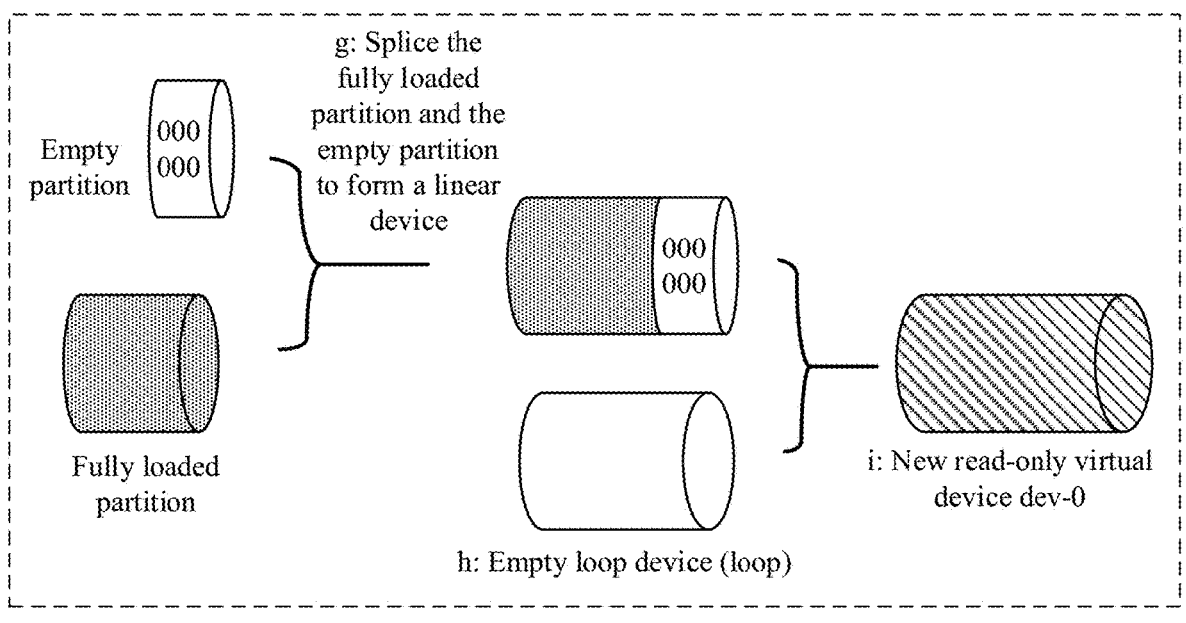
FIG. 5 is a schematic diagram of generating a virtual device according to an embodiment of this application.

FIG. 5 is a schematic diagram of generating a virtual device according to an embodiment of this application. As shown in FIG. 5, the process of generating the virtual device may include the following steps.

g: Splice and combine a fully loaded partition and a compressed empty partition 000000 to form a new linear device.

h: Determine an empty loop device (loop).

i: The new linear device and the empty loop device (loop) form a new virtual device dev-0.

It should be understood that, regardless of a file system, the new virtual device dev-0 may implement an external write interface, or may not implement an external write interface. It should be further understood that the empty loop device (loop) is a device whose size is equal to that of the new linear device and whose content is all zeros.

Figure 6:
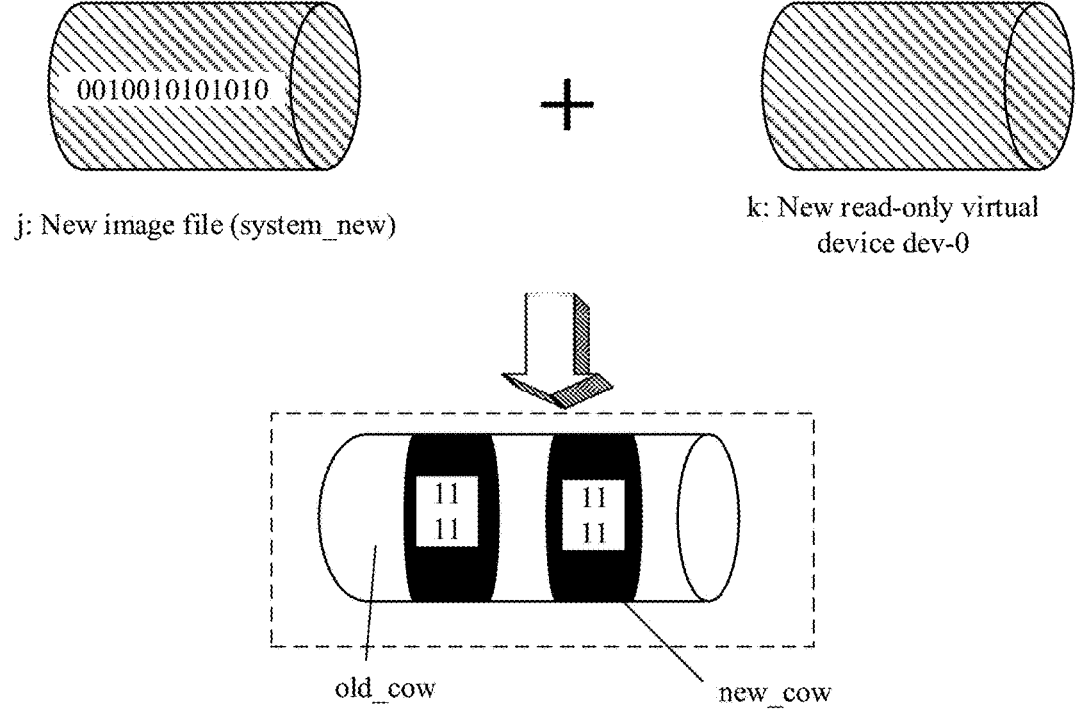
FIG. 6 is a schematic diagram of generating a differential device according to an embodiment of this application.

FIG. 6 is a schematic diagram of generating a differential device according to an embodiment of this application. As shown in FIG. 6, the process of generating the differential device may include the following steps.

j: The server obtains the new image file (system_new) in FIG. 4.

k: The server obtains the new virtual device dev-0 in FIG. 5.

l: Generate the differential device dev-cow, namely, the latest patch file, based on the new image file (system_new) and the new read-only virtual device dev-0.

Specifically, the new image file (system_new) generated through packaging based on a disk block in step a to step f is used as a new file, is read in a unit of a block from head to tail, and then written into dev-0. In a writing process, when a disk block is written into an image fully loaded with data blocks of the block 1, the block 2, the block 3, and the block 4, the disk block is compared with data of a disk block of the new image file (system_new). If data of a disk block is different, the data block is written into the empty loop device. Disk blocks of the blocks 5, 6, and 7 fall beyond a size of the fully loaded device, these disk blocks are directly written to the device dev-0, then the device dev-cow is generated, and the device includes a changed disk block in file new.

Optionally, when a disk partition is not fully loaded, for example, in FIG. 4, the disk partition is not fully loaded when the data blocks of the blocks 1, 2, 3, and 4 are placed in an old image file, the new image file (system_new) can be obtained without a need to newly add an empty partition 000000 to expand a disk. In addition, correspondingly, in FIG. 5, the fully loaded partition does not need to be expanded by using the empty partition 000000. In other words, the fully loaded partition and an empty loop device (loop) of a same size may form the new virtual device dev-0 without a need to perform splicing in step 315, and then the differential device dev-cow is generated based on the new image file (system_new) and the new virtual device dev-0. This is not limited in this application.

In the foregoing technical solution, the process of generating the new patch file (the latest patch file) on the server side is described. When a repair problem exists in a case of the fully loaded partition, or when a feature of the terminal device needs to be expanded but there is no remaining space in a related partition, the terminal device may search for and download a patch file from the server, and a compressed empty device (loop) is used to expand the feature. For example, the empty loop device and the fully loaded partition may be combined to form a new device, so that a very small space can be used for configuration and expansion to obtain a large space. In addition, based on a packaging technology in a disk block dimension, a changed file is repackaged in the disk block dimension, to ensure that the file can still be written into an added disk block in a case of the fully loaded partition. In addition, the changed patch file is packaged in the disk block dimension, so that only a disk block of the patch file changes, and a disk block of another file is not affected, to improve patch release efficiency.

It should be understood that, in a process in which the server 10 sends the latest patch file to the terminal device 20, the server 10 delivers the compressed empty device (loop) together with the latest patch file (dev-cow) to the terminal device 20, and the terminal device 20 may store the compressed empty device and the latest patch file in a local system. This is not limited in this application.

Figure 7:
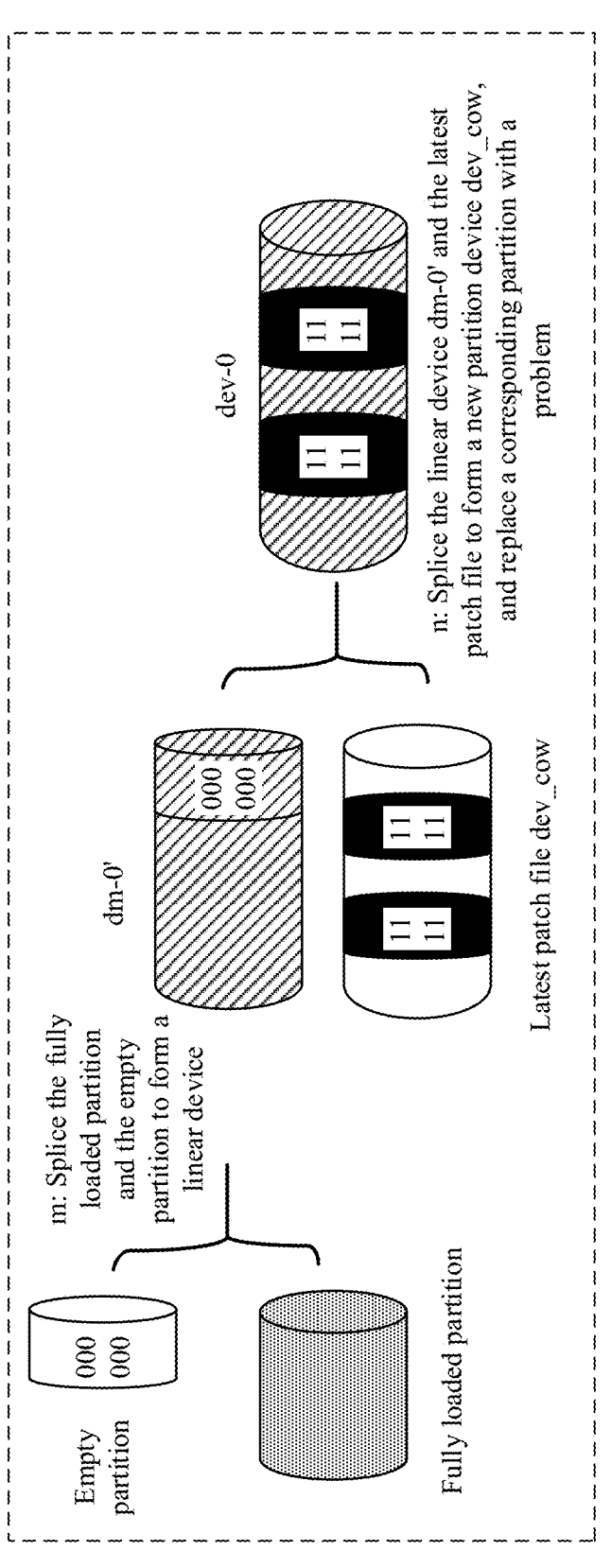
FIG. 7 is a schematic diagram of a process in which a patch takes effect according to an embodiment of this application.

FIG. 7 is a schematic diagram of a process in which a patch takes effect according to an embodiment of this application. As shown in FIG. 7, when it is determined, based on the latest patch file (dev-cow) delivered by the server 10, that the fully loaded partition needs to be expanded, a process in which a patch of the terminal device 20 takes effect specifically includes the following steps:

m: The terminal device 20 combines the fully loaded partition and the empty partition 000000 to form a linear device, namely, a device dm-0'.

n: Combine the linear device dm-0' and the latest patch file (dev-cow) to form a new partition device dev-0, and replace a corresponding partition with a problem based on the new partition device, to resolve the problem.

In other words, the terminal device receives the update file sent by the server, and the update file includes the target patch block. The target patch block includes content that is in a patch file and that is added or changed relative to the original file in the terminal device. The terminal device may restore a latest patch file based on the update file and the original file, and then perform updating based on the patch file.

In a possible embodiment, the update file obtained by the terminal device further includes information about a location of each target patch block in the patch file.

In a possible embodiment, the location that is of each target patch block in the patch file and that is obtained by the terminal device corresponds to a location in the patch file.

In the foregoing manner, after obtaining the target patch block, the terminal device may accurately learn of a location of a changed or updated patch block, to restore the latest patch file.

It should be understood that when the device dev-cow in the latest patch file and the device dm-0' are combined to form the new partition device dev-0, the device dev-0 obtained through a combination needs to have same content as the new image file (system_new) generated through repackaging in step 1. In other words, the terminal device completes a process of restoring the new image file, and performs updating based on the new image file.

It should be further understood that, it can be learned, based on a device mapper, that the device dev-cow in the latest patch file and the device dm-0' have a same size.

In the foregoing technical solution, a process in which the terminal device side obtains and restores the new patch file (the latest patch file) is described. When a repair problem exists in a case of the fully loaded partition, or when a feature of the terminal device needs to be expanded but there is no remaining space in a related partition, a compressed empty device (loop) in the patch file may be used to expand the feature of the terminal device.

Figure 8:
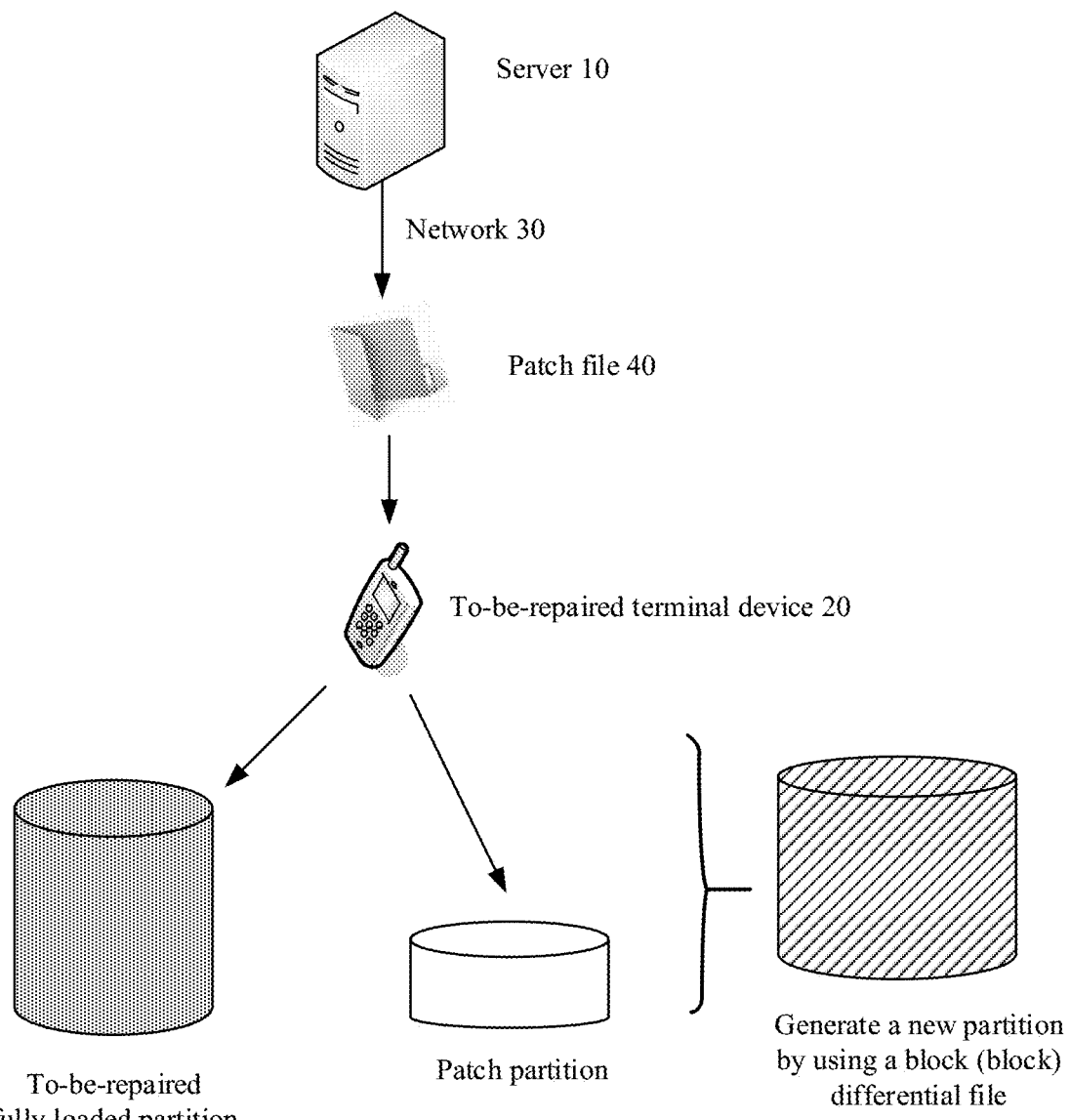
FIG. 8 is a schematic diagram of a patch release process according to an embodiment of this application.

FIG. 8 is a schematic diagram of a patch release process according to an embodiment of this application. For example, as shown in FIG. 8, a to-be-repaired terminal device 20 obtains a patch file 40 from a server 10. When a to-be-repaired partition is a fully loaded partition, an empty loop device and the fully loaded partition may be combined to form a new device by using a block differential file, so that a very small space can be used for configuration and expansion to obtain a large space. In addition, because a changed patch file is packaged in a disk block dimension on the server side, only a disk block of the patch file changes, to reduce a size of the patch file, and improve transmission efficiency of the patch file.

Figure 9:
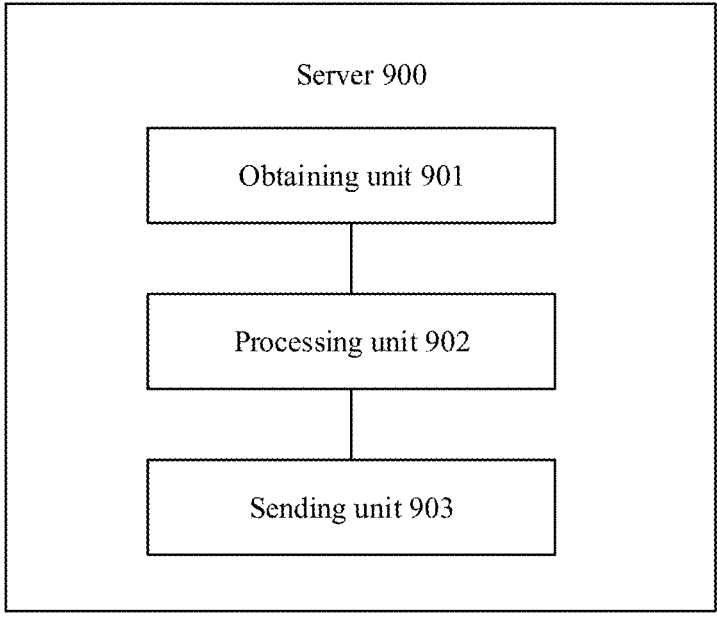
FIG. 9 is a schematic diagram of composition of a patch release apparatus according to an embodiment of this application.

With reference to the foregoing described embodiments and related accompanying drawings, this application provides a patch release apparatus. FIG. 9 is a schematic diagram of a patch release apparatus 900 according to an embodiment of this application. It may be understood that, the patch release apparatus 900 may be the foregoing server, or a chip or component applied to the server, and each module or unit in the apparatus 900 is respectively configured to perform each action or processing process performed by the server 10 in the foregoing method 300, and/or another process of the technology described in this specification. The apparatus 900 includes a corresponding hardware and/or software module for performing each function. As shown in FIG. 9, the apparatus 900 may include:

an obtaining unit 901, configured to obtain a patch file;

a processing unit 902, configured to divide the patch file into a plurality of patch blocks, where the processing unit 902 is further configured to determine a target patch block from the plurality of patch blocks, where the target patch block includes content that is in the patch file and that is added or changed relative to an original file in a terminal device; and a sending unit 903, configured to send an update file to the terminal device, where the update file includes the target patch block.

In a possible embodiment, the update file further includes information about a location of each target patch block in the patch file.

In another possible embodiment, the location of each target patch block in the patch file corresponds to a location in the patch file.

In another possible embodiment, the processing unit 902 is further configured to divide the patch file into at least two subfiles based on a first storage space, where the first storage space is a storage space used by the terminal device to store the original file corresponding to the patch file, and a size of a storage space occupied by a first subfile in the at least two subfiles is less than or equal to a size of the first storage space; and the sending unit 903 is further configured to send the at least two subfiles and first information, where the first information is used to indicate to combine the at least two subfiles to form a virtual machine device for use.

Optionally, the obtaining unit is further configured to receive second information sent by the terminal device, where the second information is used to indicate that a difference between the size of the first storage space and a size of the storage space occupied by the original file is less than or equal to a preset threshold.

In another possible embodiment, the obtaining unit 901 is further configured to receive third information sent by the terminal device, where the second information is used to indicate the size of the first storage space.

It should be understood that the apparatus 900 may correspond to the server 10 in the method 300 in the embodiments of this application, and the apparatus 900 may alternatively be a chip or a component applied to the server 10. In addition, each module in the apparatus 900 implements a corresponding procedure in the method 300 in FIG. 3. For example, the processing unit 902 is configured to perform 301 and 302 in the method 300, and the sending unit 903 is configured to perform 303 in the method 300. A specific process in which each unit performs the foregoing corresponding step is described in detail in the method 300. For brevity, details are not described herein again.

Figure 10:
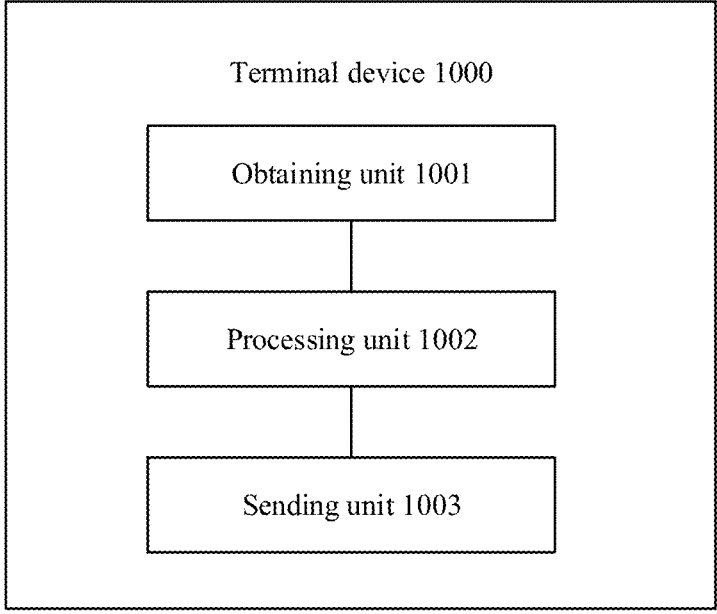
FIG. 10 is a schematic diagram of composition of a patch release apparatus according to an embodiment of this application.

This application provides another patch release apparatus. FIG. 10 is a schematic diagram of a patch release apparatus 1000 according to an embodiment of this application. It may be understood that, the patch release apparatus 1000 may be the foregoing terminal device 20, or a chip or component applied to the terminal device 20, and each module or unit in the apparatus 1000 is respectively configured to perform each action or processing process performed by the terminal device 20 in the foregoing method 300, and/or another process of the technology described in this specification. The apparatus 1000 includes a corresponding hardware and/or software module for performing each function. As shown in FIG. 10, the apparatus 1000 may include:

an obtaining unit 1001, configured to receive an update file sent by a server, where the update file includes a target patch block, the target patch block includes content that is in a patch file and that is added or changed relative to an original file in the terminal device, the patch file is divided into a plurality of patch blocks, and the target patch block is determined from the plurality of patch blocks; and a processing unit 1002, configured to determine the patch file based on the update file and the original file, where the processing unit 1002 is further configured to perform updating based on the patch file.

In a possible embodiment, the update file further includes information about a location of each target patch block in the patch file.

In a possible embodiment, the location of each target patch block in the patch file corresponds to a location in the patch file.

In a possible embodiment, the obtaining unit 1001 is further configured to receive at least two subfiles and first information that are sent by the server, where the at least two subfiles are obtained by dividing the patch file, a size of a storage space occupied by a first subfile in the at least two subfiles is less than or equal to a size of a first storage space, and the first storage space is a storage space used by the terminal device to store the original file corresponding to the patch file; and the processing unit 1002 is further configured to: store the first subfile in the first storage space, and store, in at least one second storage space, a file other than the first subfile in the at least two subfiles; and when running a program corresponding to the patch file, combine the at least two subfiles to form a virtual machine device.

In a possible embodiment, the apparatus further includes a sending unit 1003, configured to send second information to the server, where the second information is used to indicate that a difference between the size of the first storage space and a size of the storage space occupied by the original file is less than or equal to a preset threshold.

In a possible embodiment, the sending unit 1003 is further configured to send third information to the server, where the second information is used to indicate the size of the first storage space.

It should be understood that the apparatus 1000 may correspond to the terminal device 20 in the method 300 in the embodiments of this application, and the apparatus 1000 may alternatively be a chip or a component applied to the terminal device 20. In addition, each module in the apparatus 1000 implement a corresponding procedure in the method 300 in FIG. 3. Specifically, the processing unit 1002 is configured to perform 304 and 305 in the method 300, and the obtaining unit 1001 is configured to perform 303 in the method 300. A specific process in which each unit performs the foregoing corresponding step is described in detail in the method 300. For brevity, details are not described herein again.

An embodiment of the present invention further provides an electronic apparatus or a terminal device. In addition to the modules shown in FIG. 10, the electronic apparatus or the terminal device may further include a baseband processor, a transceiver, a display, an input/output apparatus, or the like, for example, an external memory interface, an internal memory, a universal serial bus (USB) interface, a charging management module, a power management module, a battery, an antenna, a mobile communication module, a wireless communication module, an audio module, a speaker, a telephone receiver, a microphone, a headset jack, a sensor module, a button, a motor, an indicator, a camera, a display, or a subscriber identification module (SIM) card interface.

The sensor module may include a pressure sensor, a gyro sensor, a barometric pressure sensor, a magnetic sensor, an acceleration sensor, a proximity sensor, a proximity light sensor, a fingerprint sensor, a temperature sensor, a touch sensor, an ambient light sensor, a bone conduction sensor, or the like.

It may be understood that the structure shown in the embodiments of this application does not constitute a specific limitation on the electronic apparatus or the terminal device. In some other embodiments of this application, the electronic apparatus or the terminal device may include more or fewer components than the illustrated or listed components, or combine some components, or split some components, or have different component arrangements. The illustrated components may be implemented by using hardware, software, or a combination of software and hardware. This is not limited in this application.

It may be understood that, to implement the foregoing functions, the electronic apparatus includes a corresponding hardware and/or software module for performing each function. With reference to algorithm steps of each example described in the embodiments disclosed in this specification, this application may be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to the embodiments, but it should not be considered that the embodiment goes beyond the scope of the embodiments of this application.

In the embodiments, function modules of the electronic device may be obtained through division according to the foregoing method examples. For example, the function modules may be obtained through division corresponding to various functions, or two or more functions may be integrated into one processing module. The integrated module may be implemented in a form of hardware. It should be noted that, in the embodiments, division into modules is an example, and is merely logical function division. In an actual embodiment, another division manner may be used.

It should be noted that all related content of the steps in the foregoing method embodiments may be cited in function descriptions of corresponding function modules. Details are not described herein.

The electronic apparatus provided in the embodiments is configured to perform the patch release method. Therefore, an effect the same as that of the foregoing embodiment method can be achieved.

In a case of an integrated unit, the electronic device may include a processing module, a storage module, and a communication module. The processing module may be configured to control and manage an action of the electronic apparatus, for example, may be configured to support the electronic apparatus in performing steps performed by the foregoing units. The storage module may be configured to support the electronic apparatus in storing program code, data, or the like. The communication module may be configured to support communication between the electronic apparatus and another device.

The processing module may be a processor or a controller. The processor may implement or execute various examples of logical blocks, modules, and circuits described with reference to the content disclosed in this application. Alternatively, the processor may be a combination of processors implementing a computing function, for example, a combination of one or more microprocessors, or a combination of digital signal processing (DSP) and a microprocessor. The storage module may be a memory. The communication module may be specifically a device, for example, a radio frequency circuit, a Bluetooth chip, or a Wi-Fi chip, that interacts with another electronic apparatus.

An embodiment further provides a computer storage medium. The computer storage medium stores computer instructions. When the computer instructions run on an electronic apparatus, the electronic apparatus is enabled to perform the foregoing related method steps, to implement the patch release method in the foregoing embodiments.

An embodiment further provides a computer program product. When the computer program product runs on a computer, the computer is enabled to perform the foregoing related steps, to implement the patch release method in the foregoing embodiments.

In addition, the embodiments of this application further provide an apparatus. The apparatus may be specifically a chip, a component, or a module. The apparatus may include a processor and a memory that are connected. The memory is configured to store computer execution instructions. When the apparatus runs, the processor may execute the computer execution instructions stored in the memory, to enable the chip to perform the patch release method in the foregoing method embodiments.

The electronic device, the computer storage medium, the computer program product, or the chip provided in the embodiments is configured to perform a corresponding method provided above. Therefore, for beneficial effects that can be achieved by the electronic device, the computer storage medium, the computer program product, or the chip, refer to beneficial effects of the corresponding method provided above. Details are not described herein again.

The foregoing descriptions about embodiments allow a person skilled in the art to understand that, for convenient and brief description, division of the foregoing function modules is taken as an example for illustration. In actual application, the foregoing functions can be allocated to different modules and implemented based on a requirement. That is, an inner structure of an apparatus is divided into different function modules to implement all or some of the functions described above.

In the several embodiments provided in this application, it should be understood that the disclosed apparatus and method may be implemented in other manners. For example, division into the modules or units is merely logical function division. There may be another division manner in an actual embodiment. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions in the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of this application essentially, or the part contributing to the current technology, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of this application. The storage medium includes: any medium that can store program code, such as a USB flash drive, a removable hard disk, a read-only memory (ROM), a random access memory (random access memory, RAM), a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A patch release method, wherein the method comprises:
obtaining, by a server, a patch file;
dividing, by the server, the patch file into a plurality of patch blocks;
performing, by the server, differential processing to determine a difference between the patch file and an original file in a terminal device;
rearranging, by the server, the plurality of patch blocks of the patch file to reduce a differential offset based on one of a same timestamp used to package the patch file and the original file, or a same random value used to obfuscate the patch file and the original file;
determining, by the server, a target patch block from the plurality of patch blocks, wherein the target patch block comprises content that is in the patch file and that is added or changed relative to the original file in the terminal device;
repackaging, by the server, the target patch block in a disk block dimension to produce an update file, wherein the update file is smaller in size than the patch file and includes the target patch block in the disk block dimension; and
sending, by the server, the update file to the terminal device.

2. The method according to claim 1, wherein the update file further comprises information about a location of the target patch block in the patch file.

3. The method according to claim 2, wherein the location of the target patch block in the patch file corresponds to a location in the patch file.

4. The method according to claim 1, wherein the method further comprises:
dividing, by the server, the patch file into at least two subfiles based on a first storage space, wherein the first storage space is a storage space used by the terminal device to store the original file corresponding to the patch file, and a size of a storage space occupied by a first subfile in the at least two subfiles is less than or equal to a size of the first storage space; and sending, by the server, the at least two subfiles and first information to the terminal device, wherein the first information is used to indicate to combine the at least two subfiles to form a virtual machine device for use.

5. The method according to claim 1, wherein the method further comprises:
receiving, by the server, second information sent by the terminal device, wherein the second information is used to indicate that a difference between a size of a first storage space and a size of a storage space occupied by the original file is less than or equal to a preset threshold value.

6. The method according to claim 5,
wherein the second information is used to indicate the size of the first storage space.

7. The patch release method according to claim 1, wherein the rearranging is based on the same random value used to obfuscate the patch file and the original file.

8. A patch release method, applied in a terminal device that comprises a transceiver and a processor, wherein the method comprises:
receiving, by the transceiver of the terminal device, an update file sent by a server, wherein the update file comprises a target patch block having been determined by the server, the target patch block comprises content that is in a patch file and that is added or changed relative to an original file in the terminal device, wherein the patch file is divided into a plurality of patch blocks and the plurality of patch blocks having been rearranged by the server, based on one of a same timestamp used to package the patch file and the original file, or a map of a compilation of the original file and a map of a compilation of the patch file, to reduce a differential offset between the patch file and the original file in the terminal device, and the target patch block is determined from the plurality of patch blocks, the target patch block having been repackaged by the server in a disk block dimension, and wherein the update file is smaller in size than the patch file and includes the target patch block in the disk block dimension;
writing, by the processor of the terminal device, the update file into an added disk block based on determining that a partition of the terminal device is fully loaded;
determining, by the processor of the terminal device, the patch file based on the update file and the original file; and
performing, by the processor of the terminal device, updating based on the patch file.

9. The method according to claim 8, wherein the update file further comprises information about a location of the target patch block in the patch file.

10. The method according to claim 9, wherein the location of the target patch block in the patch file corresponds to a location in the patch file.

11. The method according to claim 8, wherein the method comprises:
receiving, by the transceiver of the terminal device, at least two subfiles and first information that are sent by the server, wherein the at least two subfiles are obtained by dividing the patch file, a size of a storage space occupied by a first subfile in the at least two subfiles is less than or equal to a size of a first storage space, and the first storage space is a storage space used by the terminal device to store the original file corresponding to the patch file;

storing, by the processor of the terminal device, the first subfile in the first storage space, and storing, in at least one second storage space, a file other than the first subfile in the at least two subfiles; and when running a program corresponding to the patch file, combining, by the processor of the terminal device, the at least two subfiles to form a virtual machine device.

12. The method according to claim 8, wherein the method further comprises:

sending, by the transceiver of the terminal device, second information to the server, wherein the second information is used to indicate that a difference between a size of a first storage space and a size of a storage space occupied by the original file is less than or equal to a preset threshold value.

13. The method according to claim 12, wherein the second information is used to indicate the size of the first storage space.

14. A patch release apparatus, wherein the apparatus comprises:

a transceiver, configured to receive an update file sent by a server, wherein the update file comprises a target patch block having been determined by the server, the target patch block comprises content that is in a patch file and that is added or changed relative to an original file in the apparatus, wherein the patch file is divided into a plurality of patch blocks and the plurality of patch blocks having been rearranged by the server, based on one of a same timestamp used to package the patch file and the original file, or a same random value used to obfuscate the patch file and the original file, to reduce a differential offset between the patch file and the original file in the terminal device, and the target patch block is determined from the plurality of patch blocks, the target patch block having been repackaged by the server in a disk block dimension, and wherein the update file is smaller in size than the patch file and includes the target patch block in the disk block dimension; and a processor, configured to:

write the update file into an added disk block based on determining that a partition of the apparatus is fully loaded;

determine the patch file based on the update file and the original file; and perform updating based on the patch file.

15. The apparatus according to claim 14, wherein the update file further comprises information about a location of the target patch block in the patch file.

16. The apparatus according to claim 15, wherein the location of the target patch block in the patch file corresponds to a location in the patch file.

17. The apparatus according to claim 14, wherein the transceiver is further configured to:

receive at least two subfiles and first information that are sent by the server, wherein the at least two subfiles are obtained by the server dividing the patch file, a size of a storage space occupied by a first subfile in the at least two subfiles is less than or equal to a size of a first storage space, and the first storage space is a storage space used by the apparatus to store the original file corresponding to the patch file; and the processor is further configured to:

store the first subfile in the first storage space, and store, in at least one second storage space, a file other than the first subfile in the at least two subfiles; and when running a program corresponding to the patch file, combine the at least two subfiles to form a virtual machine device.

18. The apparatus according to claim 14, wherein the transceiver is further configured to send second information to the server, wherein the second information is used to indicate that a difference between a size of a first storage space and a size of a storage space occupied by the original file is less than or equal to a preset threshold.

19. The apparatus according to claim 18, wherein the second information is used to indicate the size of the first storage space.

\* \* \* \* \*